(12) United States Patent
Silver et al.

(10) Patent No.: US 12,340,194 B1
(45) Date of Patent: Jun. 24, 2025

(54) SYSTEMS AND METHODS FOR STREAMLINING MODEL RISK DOCUMENTATION PLATFORM OUTPUTS USING NATIVELY SOURCED KERNELS

(71) Applicant: Citibank, N.A., New York, NY (US)

(72) Inventors: Miriam Silver, Tel Aviv (IL); Nimrod Barak, New York, NY (US); Prag Sharma, New York, NY (US); Avi Gefen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/544,303

(22) Filed: Dec. 18, 2023

(51) Int. Cl.
*G06F 8/41* (2018.01)
*G06F 8/51* (2018.01)

(52) U.S. Cl.
CPC .............. *G06F 8/4441* (2013.01); *G06F 8/51* (2013.01)

(58) Field of Classification Search
CPC .................................. G06F 8/4441; G06F 8/51
See application file for complete search history.

(56) References Cited

U.S. PATENT DOCUMENTS

2023/0231867 A1* 7/2023 Rampura Venkatachar ................ G06Q 10/0635 726/25
2024/0037245 A1* 2/2024 Kahan ................. H04L 63/1433

OTHER PUBLICATIONS

Mark Chen, "Evaluating Large Language Models Trained on Code", Jul. 2021, arXiv:2107.03374 (Year: 2021).*
Yingzhe He, "Towards Security Threats of Deep Learning Systems: A Survey", Nov. 9, 2020, IEEE (Year: 2020).*
Andrew Gordon Wilson, "Deep Kernel Learning", Proceedings of the 19th International Conference on Artificial Intelligence and Statistics, PMLR 51:370-378, 2016. (Year: 2016).*

* cited by examiner

*Primary Examiner* — Wei Y Zhen
*Assistant Examiner* — Amir Soltanzadeh
(74) *Attorney, Agent, or Firm* — Foley & Lardner LLP

(57) ABSTRACT

Systems and methods for streamlining risk modeling in software development using natively sourced kernels are described. The system may receive a native kernel for the first model, wherein the native kernel comprises a native code sample and a native description of the native code sample. The system may input the native code sample into an artificial intelligence model to generate a first output. The system may filter the first output based on the native description to generate a first validation assessment for the first model. The system may generate for display, in the user interface, the first validation assessment.

19 Claims, 7 Drawing Sheets

```
from sklearn.linear_model import LogisticRegression
# Customer Churn Prediction Model
class CustomerChurnPredictionModel:
    def __init__(self, X_train, y_train):
        self.model = LogisticRegression()
        self.model.fit(X_train, y_train)
    def predict(self, X):
        return self.model.predict_proba(X)[:, 1]
# Load the training data
X_train = pd.read_csv('customer_churn_training_data.csv')
...
recall = np.mean(y_pred[y_test == 1] == 1)
```

110

The purpose of the model is to predict which customers are likely to churn, or cancel their service, in the next 6 months. The model takes as input a variety of customer data, including demographics, account history, and product usage patterns. The model outputs a probability score for each customer, indicating the likelihood that they will churn. The model's performance metrics include accuracy, precision, recall, and F1 score.

This model is a logistic regression model that is trained to predict the likelihood of a customer churning. The model takes as input customer demographics, customer usage data, and customer satisfaction data. The model outputs a probability score that indicates the likelihood of the customer churning.... The model was trained on ....

Model Inputs: ... Customer satisfaction data (e.g., customer survey scores, support tickets)

Model Performance Metrics:... Recall: The percentage of customers who actually churn that the model predicts will churn...

The main risk associated with deploying this model in production is that it may make incorrect predictions about whether or not a customer will churn. This could lead to the institution losing customers or incurring additional costs to retain customers. To mitigate this risk, the institution will monitor the model's performance in production and retrain the model on new data as needed. The institution will also use the model's predictions in conjunction with other factors, such as customer relationship management data, to make decisions about customer retention.....

FIG. 2B

SYSTEMS AND METHODS FOR STREAMLINING MODEL RISK DOCUMENTATION PLATFORM OUTPUTS USING NATIVELY SOURCED KERNELS

BACKGROUND

Artificial intelligence, including, but not limited to, machine learning, deep learning, etc. (referred to collectively herein as "artificial intelligence models", "machine learning models," or simply "models") has excited the imaginations of both industry enthusiasts and the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems related to model risk. Model risk refers to the potential for errors, biases, inaccuracies, or unexpected behaviors within the models themselves. It encompasses the risks associated with the development, deployment, and utilization of models. For example, models might provide inaccurate predictions or classifications, leading to incorrect decisions. The uncertainty inherent in model algorithms, especially in complex or novel situations, can contribute to this risk. To further compound this issue, some models, like deep neural networks, are complex and lack transparency, making it difficult to understand how they arrive at specific conclusions. This opacity can pose risks, particularly in critical applications where interpretability is crucial. As another example, model performance heavily relies on the quality and relevance of the training data. Inaccurate, incomplete, or biased data can lead to poor model performance or unexpected behaviors. Even with accurate data, over time, the relationship between input data and the real-world phenomenon being modeled may change. This can lead to a decline in model performance if the model is not regularly updated or retrained with new data. Finally, models can be vulnerable to adversarial attacks, where malicious inputs are specifically designed to deceive the model, leading to incorrect outputs or compromising the system's security. Blindly trusting models without understanding their limitations or using them in inappropriate contexts can lead to overreliance and incorrect decisions, posing risks to businesses and stakeholders. These technical problems present an inherent issue when attempting to use artificial intelligence-based solutions.

SUMMARY

In view of the aforementioned technical problems, systems and methods are described herein for streamlining software development that contains artificial intelligence components to be aligned with model risk management policies, standards, and/or guidelines. Model risk management for artificial intelligence models may refer to the process of identifying, assessing, mitigating, and/or monitoring the risks associated with the development, deployment, and/or usage of artificial intelligence models as well as documenting those risks in model development documentation. For example, a software development team may be required to identify and document potential risks associated with models, such as biases, data quality issues, interpretability challenges, security vulnerabilities, model drift, and/or unexpected outcomes, as well as assess the likelihood and impact of identified risks and/or how these risks might affect the model's performance, compliance, reputation, and/or the organization's overall objectives. To identify and document potential risks and/or impacts thereof, the software development team may use a model risk documentation platform to generate comprehensive records of model development, validation, and performance, which are crucial for reporting on model performance, risks, and actions taken to mitigate those risks.

To achieve these features, the model risk documentation platform utilizes an artificial intelligence solution that serves as an intelligent assistant in the validation of artificial and/or model processes, contributing to increased efficiency and accuracy through its ability to use Large Language Model (LLM) components to learn from unstructured data and transfer knowledge from other areas as well as generate text, code, and/or documentation snippets that address model risk management.

Unfortunately, utilizing an artificial intelligence solution for a model risk documentation platform invokes many of the technical challenges inherent to artificial intelligence itself. For example, a model risk documentation platform for artificial intelligence models typically involves training an artificial intelligence model to detect patterns (or anomalies) in the performance or other characteristics of existing models that may indicate a potential risk (or lack thereof). To maintain the accuracy, the model risk documentation platform must receive training data with high quality and representativeness of model performances and/or characteristics (e.g., labeled training data) that can impact performance (e.g., used to categorize a given model). However, training data with high quality and representativeness for training a model for model risk documentation platform is sparse and difficult to generate.

For example, generating training data for the model risk documentation platform comprises the system extracting rules or requirements from risk management guidelines, summarizing application/software code, determining business requirements, parsing public domain knowledge bases, and/or otherwise identifying industry best practices and knowledge. The system then formats these extracted rules to generate labeled documentation and/or improvements to application processes, code functions, and/or software workflow approaches. The labeled documentation and/or improvements must then be compared to code samples that conform to (or violate) the extracted rules in order to validate specific code samples. Once the model is trained, code samples may be inputted into the model to be validated.

However, validating code samples based on formatted rules raises yet another technical issue. In most instances, the labeled documentation and/or improvements to rules are extracted, formatted, and/or summarized from copious amounts of different sources, in which each source includes its own terminology and/or taxonomy. Additionally, each individual label documentation and/or improvement may correspond to multiple rules. Thus, inputting a code sample for validation, querying the model for documentation for a particular rule, and/or requesting generation of a code sample may result in the system outputting copious amounts of non-essential code, rules, and/or documentation (e.g., code, rules, and/or documentation relating to potential issues not needed to be addressed). One approach to such a problem would be to limit the input to the model (e.g., allow inputs of only a portion of a code sample, train the model on only a portion of the sources, require length limits on documentation produced). Such an approach however would unnaturally restrict the outputs (e.g., degrading their quality and/or completeness), limit the ability of the model to detect context (e.g., based on different terminology and/or taxonomy), and/or impact accuracy of the predictions by further limiting the already sparse training data.

The systems and methods overcome this issue through the use of a native kernel for generating code, rules, and/or documentation in the model risk documentation platform. For example, the native kernel streamlines the code, rule, and/or documentation process by automating the generation of relevant and accurate content. The native kernel does this by comprising an objective or guideline relevant to the desired output that is native (e.g., described in the terminology and/or taxonomy) of the source content (e.g., the native code, rule, and/or documentation). The native kernel is processed independently through the model risk documentation platform such that the native kernel is not used to generate outputted code, rule, and/or documentation, which could risk introducing bias, but is instead used to filter the output to outputted code, rule, and/or documentation specific to the objective or guideline.

Moreover, as the native kernel is described in the native terminology and/or taxonomy, the native kernel is intuitively selectable by a user that may be referencing the source content. As such, the model risk documentation platform may provide concise and context-aware responses to queries for model risk management-specific questions, such as explaining the impact of model drift on performance. Given the conversational manner of the inputs and outputs, the system may assist in generating reports, summaries, and/or briefs on model validation requirements while improving the efficiency of communication within the validation process. Similarly, the model risk documentation platform may create concise documentation snippets based on code, describing functions or summarizing models.

In some aspects, systems and methods for streamlining risk modeling in software development using natively sourced kernels are described. For example, the system may receive, via a user interface, a first user input comprising a validation request for a first model, wherein the first model corresponds to a first software development project. The system may receive, via the user interface, a second user input comprising a native kernel for the first model, wherein the native kernel comprises a native code sample and a native description of the native code sample. The system may input the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, and wherein the labeled code samples comprise a first subset of labeled code samples successfully validated against the rulesets and a second subset of labeled code samples unsuccessfully validated against the rulesets. The system may filter the first output based on the native description to generate a first validation assessment for the first model. The system may generate for display, in the user interface, the first validation assessment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-1B show an illustrative user interface generating inputs to a model risk documentation platform, in accordance with one or more embodiments.

FIGS. 2A-2B show an illustrative user interface generating outputs for model risk documentation platform, in accordance with one or more embodiments.

DETAILED DESCRIPTION OF THE DRAWINGS

Figure 3A:
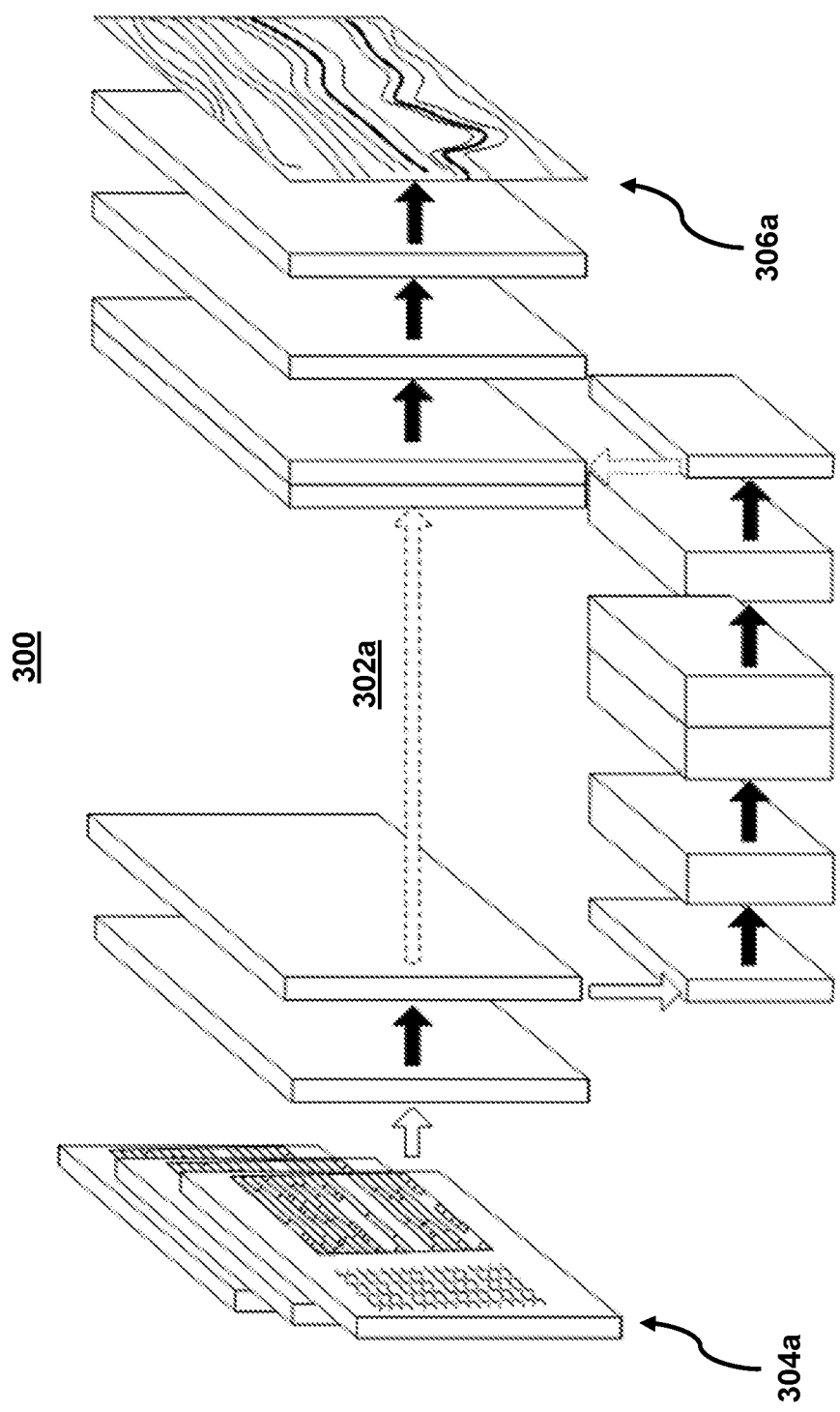
FIGS. 3A-3B show illustrative components for a system used to provide a model risk documentation platform, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIGS. 1A-1B show an illustrative user interface generating inputs to a model risk documentation platform, in accordance with one or more embodiments. As described herein, a model risk documentation platform may comprise a system or framework designed to oversee and manage the risks associated with models (e.g., financial models) used within an organization. For example, these platforms may be used for ensuring the accuracy, reliability, and/or compliance of models used in various financial and business operations. The model risk documentation platform may help in identifying, assessing, mitigating, and/or monitoring risks arising from model usage.

In some embodiments, the model risk documentation platform may catalog a plurality of models used within an organization, including their purposes, data sources, methodologies, and dependencies. The model risk documentation platform may evaluate the risks associated with each model, categorizing them based on complexity, materiality, regulatory impact, and/or potential issues. The model risk documentation platform may conduct rigorous testing and validation processes to ensure the accuracy, reliability, and/or appropriateness of the models used. This may involve comparing model outputs against real-world data and validating the assumptions and methodologies used. The model risk documentation platform may maintain comprehensive documentation of models and their development processes, assumptions, limitations, and validation results. For example, the system may be used to automate the preparation of Model risk management validation documentation, which can be a time-consuming and error-prone process. The model risk documentation platform may implement governance policies and procedures to ensure compliance with regulatory standards and internal guidelines. The model risk documentation platform may continuously monitor model performance and changes in assumptions or data inputs and/or provide regular reports to stakeholders, highlighting any emerging risks or issues. The model risk documentation platform may manage different versions of models and track changes made to ensure transparency and accountability. The model risk documentation platform may integrate with other systems and facilitate collaboration among different departments involved in model development, validation, and usage. For example, the system model risk documentation platform may ensure adherence to regulatory requirements, industry standards, and best practices related to model risk management.

Model risk management for artificial intelligence models may refer to the process of identifying, assessing, mitigating, and/or monitoring the risks associated with the development, deployment, and/or usage of artificial intelligence models. For example, the model risk management may detect and document the potential risks associated with models, such as biases, data quality issues, interpretability challenges, security vulnerabilities, model drift, and/or unexpected outcomes. Model risk management may also assess the likelihood and impact of identified risks and/or how these risks might affect the model's performance, compliance, reputation, and/or the organization's overall objectives. Model risk management may also include generating comprehensive records of model development, validation, and performance, which is crucial as reporting on model performance, risks, and actions taken to mitigate those risks is essential for internal stakeholders, regulators, and/or auditors.

As referred to herein, a "user interface" may comprise a human-computer interaction and communication in a device and may include display screens, keyboards, a mouse, and the appearance of a desktop. For example, a user interface may comprise a way a user interacts with an application or a website. A user interface for a model risk documentation platform may comprise any content.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

In some embodiments, the content may comprise inputs and outputs that are generated for display on a user interface. As described below, the system may receive inputs in a native format to a given model and receive outputs in a platform format. The model risk documentation platform may be designed to automate manual processes that have unstructured or frequently changing requirements. In some embodiments, the system may use an LLM and/or related components to learn from unstructured data and transfer knowledge from other areas, such as academic research. By doing so, the system may be more flexible and capable than rule-based solutions. The system may use these inputs to generate one or more outputs.

The model risk documentation platform may generate concise text answers for model risk management-specific questions, provide context-aware text generation, and assist with generating reports, summaries, and briefs on model validation requirements. The model risk documentation platform may also generate code snippets for model risk management tasks such as data cleaning, data preprocessing, and/or checking for outliers. The model risk documentation platform may generate concise documentation snippets based on code, such as describing a Python function or summarizing a machine learning model.

For example, the system may generate documentation in a required format for model risk management validation or other risk management review and for software, code, and/or applications. The system may perform this by extracting rules or requirements from risk management guidelines and extracting summaries from application/software code, business requirements, public domain knowledge bases, and/or other user/app documentation, as well as industry best practices and knowledge. The system may then use this knowledge to write documentation or suggest improvements to the application/approach.

In some embodiments, the system may intelligently extract rules and requirements from dynamic risk management guidelines, ensuring that the documentation remains up to date with the latest standards. To do so, the system may pull information from diverse sources, including application/software code, business requirements, domain knowledge, user and application documents, and industry best practices, as well as utilize advanced natural language processing to summarize complex information and distill key points for documentation. Unlike rule-based solutions, the system is not tied to specific templates or questions. The system may adapt to changes in model risk management requirements by dynamically incorporating updates, ensuring flexibility in addressing evolving industry standards. The system may leverage LLM components to process and learn from unstructured data, enhancing its capability to handle vast amounts of information effectively. The system may apply knowledge from various domains, including academic research, to enhance the quality and comprehensiveness of generated documentation.

In some embodiments, the system may then generate one or more outputs. For example, the system may provide concise and context-aware text answers for model risk management-specific questions, such as explaining the impact of model drift on performance. The system may assist in generating reports, summaries, and briefs on model validation requirements, improving the efficiency of communication within the validation process. The system may generate code snippets for model risk management tasks, such as data cleaning, preprocessing, and outlier detection. The system may enhance the reproducibility of validation tasks by automating the creation of code segments. The system may create concise documentation snippets based on code, describing functions or summarizing machine learning models.

For example, the model risk documentation platform (or system) may be used to generate a concise text answer to the following a model risk management-specific question such as "Explain the impact of model drift on performance?" The system may be used to provide context-aware text generation based on the following input: "Model drift can occur when the underlying data distribution changes over time. This can lead to a decrease in model performance, as the model is no longer able to accurately predict the target variable." The system may be used to assist with generating a report on model validation requirements for a new machine learning model. The system may be used to generate a code snippet for cleaning data for a model validation task. The system may be used to generate a documentation snippet for a Python function that implements a machine learning model. The system may be used to generate a test plan for a new software application. The system may be used to create a user manual for a complex machine learning model. The system may be used to generate a risk assessment report for a new software development project. The system may be used to create a compliance checklist for a software application that is subject to regulatory requirements. The system may be used to generate a technical document that explains the design and implementation of a software system. The system may be used to create a training document for new employees who will be using a software application. The system may be used to generate a marketing brochure for a new software product.

Additionally or alternatively, the system may identify and correct grammatical errors and typos in documentation. The system may improve the clarity and conciseness of documentation. The system may add additional information to documentation, such as examples, illustrations, and definitions. The system may ensure that documentation is consistent with the latest software version. The system may make documentation more accessible to a wider audience by translating it into multiple languages.

FIG. 1A shows user interface 100. For example, the system may receive, via user interface 100, a first user input comprising a validation request for a first model, wherein the first model corresponds to a first software development project. A validation request may comprise a request to perform various tests and analyses to assess the model's performance. For example, this may involve comparing the model outputs with actual data, stress testing, sensitivity analysis, and/or scenario analysis to evaluate its accuracy, robustness, and potential weaknesses. Software development may be the process of creating, designing, programming, testing, and/or maintaining computer programs, applications, or systems. It may involve a structured approach to building software that fulfills specific requirements, solves problems, or provides functionalities for various purposes. User interface 100 may also receive a second user input.

The system may receive, via user interface 100, a second user input comprising a native kernel for the first model, wherein the native kernel comprises a native code sample and a native description of the native code sample. For example, as described herein, a native kernel for a model may refer to content that describes a core or foundational component of the model that the model risk documentation platform may use to generate outputs related to a particular model's life cycle, evaluation, validation, monitoring, and/or risk assessment. A native kernel may include one or more characteristics that are used by the model risk documentation platform to generate outputs. For example, the characteristics may comprise a model life cycle management characteristic (e.g., a characteristic that relates to the life cycle of a model, including model development, testing, deployment, and decommissioning), a versioning and tracking characteristic (e.g., a characteristic that relates to tracking different versions of the model and changes made over time and maintains a historical record of alterations, updates, or modifications), a documentation and metadata characteristic (e.g., a characteristic that relates to documentation and metadata related to the model, such as its purpose, inputs, outputs, assumptions, limitations, and associated risks), a validation and testing characteristic (e.g., a characteristic that relates to validation techniques, such as backtesting, stress testing, sensitivity analysis, and other validation procedures to ensure the model's accuracy and reliability), a risk assessment and governance characteristic (e.g., a characteristic that relates to tools and functionalities to assess and monitor risks associated with the model, including identifying biases, errors, or uncertainties), an integration with regulatory compliance characteristic (e.g., a characteristic that relates to integrating compliance requirements, ensuring that the model adheres to regulatory standards and guidelines), a collaboration and workflow management characteristic (e.g., a characteristic that relates to enabling collaboration among different stakeholders involved in managing the model, allowing for efficient workflow management and communication), a monitoring and performance analysis characteristic (e.g., a characteristic that relates to monitoring the model's performance in real time or at regular intervals, allowing for timely identification of issues or deviations from expected behavior), a security and access control characteristic (e.g., a characteristic that relates to implementing robust security measures to protect sensitive model information and data and controls access to authorized users), and/or a scalability and flexibility characteristic (e.g., a characteristic that relates to accommodating various types of models and their specific requirements, allowing scalability and flexibility in managing diverse models within the platform).

In some embodiments, the native kernel may comprise a native description of the native code sample and/or a native code sample. For example, as shown in user interface 100, the system may receive a native description of the native code sample. As described herein, a native description of a model may refer to a comprehensive and detailed representation or documentation of the model's characteristics, functionalities, assumptions, inputs, outputs, limitations, and underlying methodologies, among other crucial information. This description may be created external to the platform itself and may be specific to the model being analyzed or managed. For example, the native description may comprise terminology and/or taxonomies that are specific to the model and not used by/specific to the model risk documentation platform.

The native description may comprise native description characteristics such as content related to model specifications (e.g., detailed information about the model's purpose, objectives, and the problem it aims to solve), model architecture (e.g., description of the model's structure, including algorithms, equations, or techniques used), input data (e.g., explanation of the data sources, variables, and assumptions used as inputs for the model), model validation and testing (e.g., documentation of how the model was validated, including backtesting, stress testing, sensitivity analysis, and other validation procedures), assumptions and limitations (e.g., articulations of the assumptions made by the model and its limitations in different scenarios or conditions), model outputs (e.g., explanation of how the model generates outputs and the interpretation of those outputs), model maintenance and versioning (e.g., information on any updates, modifications, or versioning applied to the model over time), risk assessment (e.g., evaluation of potential risks associated with the model, such as biases, errors, or uncertainties), compliance and regulatory information (e.g., any relevant compliance or regulatory considerations applicable to the model), and/or documentation of changes (e.g., records of any changes made to the model or its parameters and the reasons behind those changes). For example, the system may parse the native description for native description characteristics based on applying an LLM to process and learn from unstructured data in the native description.

FIG. 1B shows user interface 110. For example, the system may receive, via user interface 110, the native kernel comprising a native code sample. As described herein, a native code sample is a segment or snippet of source code taken from a larger program or project, often provided to illustrate specific functionalities, demonstrate programming techniques, or serve as an example of how to use a particular programming language, library, and/or framework. For example, the native code sample may comprise characteristics that are specific to the model code and not used by/specific to the model risk documentation platform code.

For example, the code sample can range from a few lines to several blocks of code, depending on the complexity of the concept being demonstrated or the problem being addressed. The code sample may be self-contained and focused on showcasing particular aspects of programming or solving a specific task. For instance, a code sample might demonstrate how to read and write data from a file, implement a sorting algorithm, connect to a database, create a basic web application, or perform various data analysis tasks using a specific programming language or framework.

The native code sample may comprise characteristics that are detected by the system. For example, the native code sample characteristics of a code sample include several key aspects that define its nature and usefulness such as conciseness (e.g., code samples are typically succinct and focus on demonstrating a specific concept, function, or use case without unnecessary complexity), clarity and readability (e.g., they are written in a clear and understandable manner, using proper formatting, naming conventions, and comments to enhance readability), isolation (e.g., code samples are often self-contained, meaning they can be understood and run independently without relying on external dependencies or extensive setup), purposefulness (e.g., each code sample serves a specific purpose, whether it is illustrating a programming concept, demonstrating an application programming interface (API) usage, solving a particular problem, or showcasing a specific technique), correctness (e.g., code samples should demonstrate best practices and correctness in terms of syntax, logic, and adherence to programming principles), relevance (e.g., they are relevant to the context in which they are provided, addressing the needs or queries of the audience they are intended for, such as beginners, developers working on a specific technology, or those seeking solutions to particular problems), documentation and explanation (e.g., good code samples often include explanatory comments or documentation that clarifies the purpose of the code, highlights important details, and guides readers through understanding the implementation), versatility (e.g., while focused on a specific task or concept, code samples might also showcase versatility by providing adaptable solutions that can be modified or extended for different scenarios), testability (e.g., code samples may include elements or instructions for testing the provided functionality or demonstrating expected outcomes), and platform independence (e.g., code samples may be designed to be platform-independent or specify the required platform or environment for execution if platform-specific). The system may use these characteristics to make the native code samples useful, understandable, and/or practical for use in generating outputs.

FIGS. 2A-2B show an illustrative user interface generating outputs for model risk documentation platform, in accordance with one or more embodiments. For example, the system may generate an output comprising a validation assessment. As described herein, a validation assessment may comprise content for a model risk documentation platform that comprises an evaluation of whether a model and/or platform effectively manages, documents, and/or mitigates risks. The content for the validation assessment may relate to documentation requirements (e.g., assessing the platform's ability to capture and store comprehensive information related to the model, including model development, validation, testing, and implementation details), accuracy and completeness (e.g., validating that the platform accurately reflects the current status of a model, ensuring completeness in terms of data inputs, assumptions, methodologies, and results), risk identification and assessment (e.g., evaluating the platform's capability to identify and assess risks associated with each model), governance and compliance (e.g., ensuring the model aligns with regulatory requirements and internal governance policies), version control and change management (e.g., assessing the model's version control mechanisms to track changes made to models, ensuring transparency and accountability), security and access controls (e.g., evaluating the model's security measures to safeguard sensitive model-related information), model performance monitoring (e.g., determining whether the model deviates from expected behavior or performance metrics), reporting and visualization (e.g., evaluating the platform's ability to report capabilities of the model and/or generate comprehensive and accessible reports for stakeholders, including executives, regulators, and internal risk management teams), integration and scalability (e.g., assess the model's ability to integrate with other systems and databases within the organization), and/or user training and support (e.g., evaluating the availability and effectiveness of user training and support resources for model users to ensure proper utilization and understanding of its functionalities).

FIG. 2A includes user interface 200. User interface 200 comprises an output of platform description. As described herein, a platform description of a model may refer to a comprehensive and detailed representation or documentation of the model's characteristics, functionalities, assumptions, inputs, outputs, limitations, and underlying methodologies, among other crucial information as determined by the platform. This description may be created internally by the platform itself and may be specific to the model being analyzed or managed. For example, the platform description may comprise terminology and/or taxonomies that are specific to the platform (as opposed to a specific model).

Similar to the native description, the platform description may comprise model specifications (e.g., detailed information about the model's purpose, objectives, and the problem it aims to solve), model architecture (e.g., description of the model's structure, including algorithms, equations, or techniques used), input data (e.g., explanation of the data sources, variables, and assumptions used as inputs for the model), model validation and testing (e.g., documentation of how the model was validated, including backtesting, stress testing, sensitivity analysis, and other validation procedures), assumptions and limitations (e.g., articulations of the assumptions made by the model and its limitations in different scenarios or conditions), model outputs (e.g., explanation of how the model generates outputs and the interpretation of those outputs), model maintenance and versioning (e.g., information on any updates, modifications, or versioning applied to the model over time), risk assessment (e.g., evaluation of potential risks associated with the model, such as biases, errors, or uncertainties), compliance and regulatory information (e.g., any relevant compliance or regulatory considerations applicable to the model), and/or documentation of changes (e.g., records of any changes made to the model or its parameters and the reasons behind those changes).

FIG. 2B includes user interface 210. User interface 210 comprises an output of a platform code sample. As described herein, a platform code sample is a segment or snippet of source code taken from a larger platform program or project, often provided to illustrate specific functionalities, demonstrate programming techniques, or serve as an example of how to use a particular programming language, library, and/or framework. For example, the platform code sample may comprise characteristics that are specific to, or optimized for, the platform code.

For example, similar to the native code sample, the platform code sample can range from a few lines to several blocks of code, depending on the complexity of the concept being demonstrated or the problem being addressed. The platform code sample may be self-contained and focused on showcasing particular aspects of programming or solving a specific task for the platform (e.g., corresponding to the specific task of the native code sample). For instance, a native code sample that may have demonstrated how to read and write data from a file may be inputted into the system to receive an output of a corresponding platform code sample.

Figure 3B:
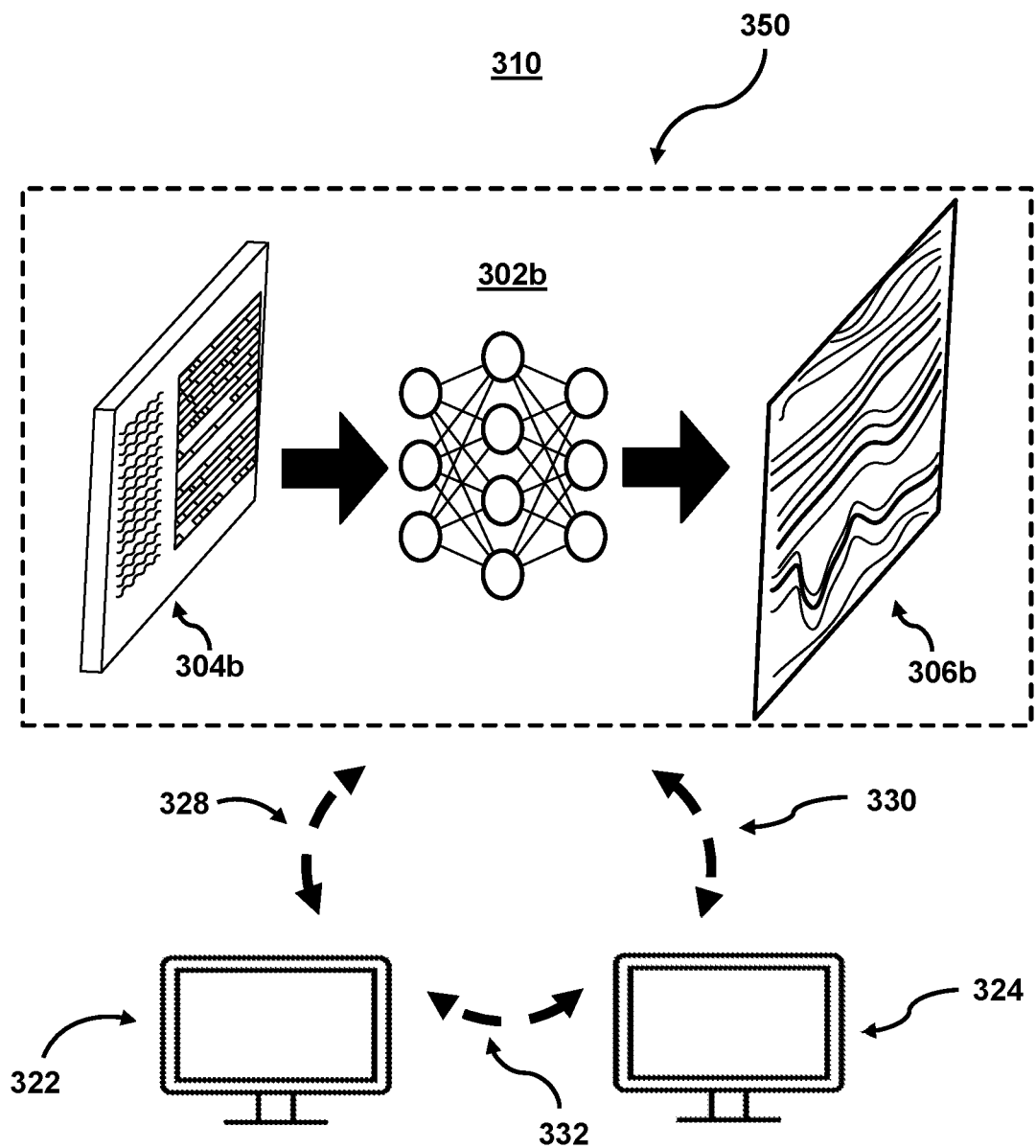

FIGS. 3A-3B show illustrative components for a system used to provide a model risk documentation platform, in accordance with one or more embodiments. For example, FIG. 3A may represent a model architecture used to streamline risk modeling in software development. System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 30a6, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction. For example, the system may catalog a plurality of models used within an organization, including their purposes, data sources, methodologies, and dependencies. The system may evaluate the risks associated with each model, categorizing them based on complexity, materiality, regulatory impact, and/or potential issues. The system may conduct rigorous testing and validation processes to ensure the accuracy, reliability, and/or appropriateness of the models used. This may involve comparing model outputs against real-world data and validating the assumptions and methodologies used. The system may maintain comprehensive documentation of models and their development processes, assumptions, limitations, and validation results. For example, the system may be used to automate the preparation of model risk management validation documentation, which can be a time-consuming and error-prone process. The system may implement governance policies and procedures to ensure compliance with regulatory standards and internal guidelines. The system may continuously monitor model performance and changes in assumptions or data inputs and/or provide regular reports to stakeholders, highlighting any emerging risks or issues. The system may manage different versions of models and track changes made to ensure transparency and accountability. The system may integrate with other systems and facilitate collaboration among different departments involved in model development, validation, and usage. For example, the system may ensure adherence to regulatory requirements, industry standards, and best practices related to model risk management.

Using this information, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

For example, the system may receive inputs of a native code sample into an artificial intelligence model (e.g., model 302a) and generate an output. The artificial intelligence model may be trained to validate code samples based on labeled source content and labeled code samples. For example, the labeled source content may comprise rulesets for security vulnerabilities that are extracted and reformatted from a plurality of sources. The labeled code samples may comprise a first subset of labeled code samples successfully validated against the rulesets and a second subset of labeled code samples unsuccessfully validated against the rulesets.

In some embodiments, the model (e.g., model 302a) may automatically perform actions based on outputs 306a. In some embodiments, the model (e.g., model 302a) may not perform any actions. The output of the model (e.g., model 302a) may be used to model risk documentation platforms. For example, the system may generate concise text answers for model risk management-specific questions, provide context-aware text generation, and assist with generating reports, summaries, and briefs on model validation requirements. The system may also generate code snippets for model risk management tasks such as data cleaning, data preprocessing, and/or checking for outliers. The system may generate concise documentation snippets based on code, such as describing a Python function or summarizing a machine learning model. For example, the system may generate documentation in a required format for model risk management validation or other risk management review and for software, code, and/or applications. The system may perform this by extracting rules or requirements from risk management guidelines and extracting summaries from application/software code, business requirements, public domain knowledge bases, and/or other user/app documentation, as well as industry best practices and knowledge. The system may then use this knowledge to write documentation or suggest improvements to the application/approach.

FIG. 3B shows illustrative components for a system used to provide a model risk documentation platform, in accordance with one or more embodiments. For example, FIG. 3B may show illustrative components for the system. As shown in FIG. 3B, system 310 may include user terminal 322 and user terminal 324. It should be noted that user terminal 322 and user terminal 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that, while one or more operations are described herein as being performed by particular components of system 310, these operations may, in some embodiments, be performed by other components of system 310. As an example, while one or more operations are described herein as being performed by components of user terminal 322, these operations may, in some embodiments, be performed by cloud components. In some embodiments, the various computers and systems described herein may include one or more computing devices that are programmed to perform the described functions. Additionally or alternatively, multiple users may interact with system 310 and/or one or more components of system 310.

With respect to the components of user terminal 322 and user terminal 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both user terminal 322 and user terminal 324 include a display upon which to display data.

It should be noted that, in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user terminal 322 or user terminal 324. Alternatively or additionally, API layer 350 may reside on one or more of system 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350 such that there is strong adoption of SOAP and RESTful web services, using resources like Service Repository and Developer Portal, but with low governance, standardization, and separation of concerns. Alternatively, system 300 may be fully based on API layer 350 such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302*b* may be trained by taking inputs 304*b* and provide outputs 306*b*. Model 302*b* may include an artificial neural network. In such embodiments, model 302*b* may include an input layer and one or more hidden layers. Each neural unit of model 302*b* may be connected with many other neural units of model 302*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., provide concise text answers for model risk management-specific questions, provide context-aware text generation, and assist with generating reports, summaries, and briefs on model validation requirements). In some embodiments, the system may use an LLM and/or related components to allow the system to learn from unstructured data and transfer knowledge from other areas, such as academic research. By doing so, the system may be more flexible and capable than rule-based solutions. The system may use these inputs to generate one or more outputs.

Model 302b is shown as a convolutional neural network. A convolutional neural network consists of an input layer (e.g., input 304b), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
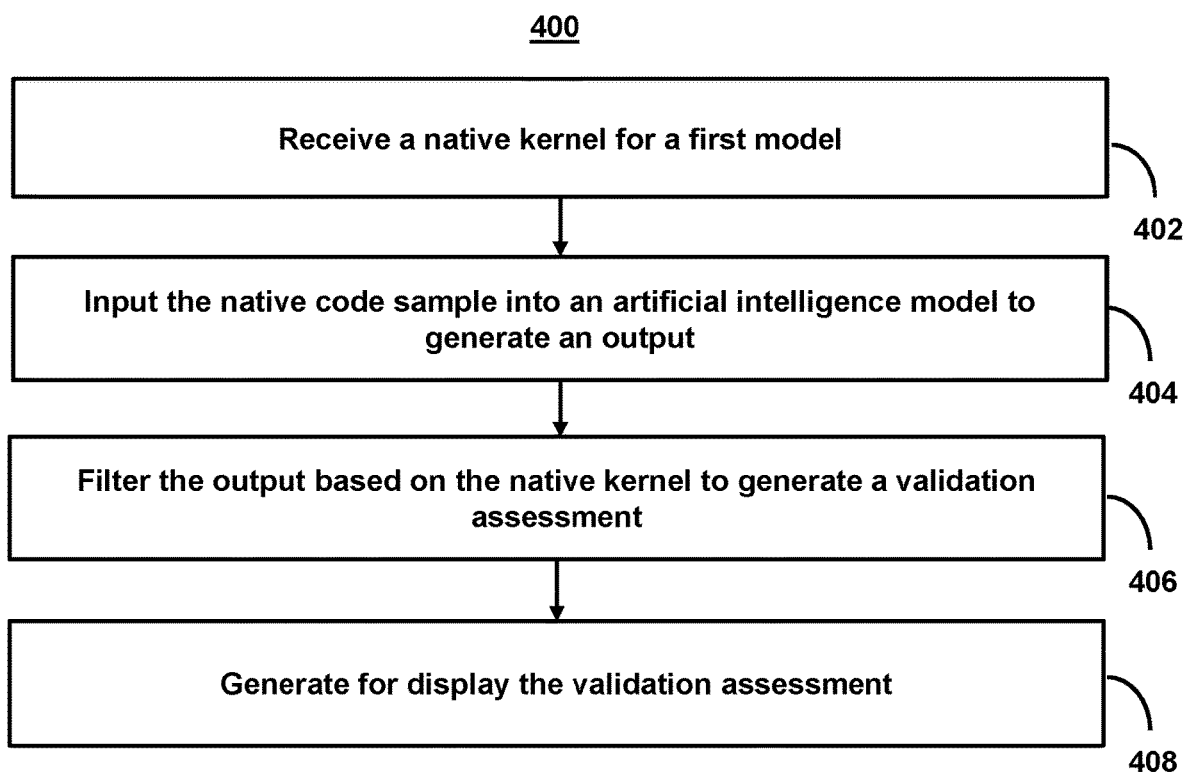
FIG. 4 shows a flowchart of the steps involved in streamlining risk modeling in software development, in accordance with one or more embodiments.

FIG. 4 shows a flowchart of the steps involved in streamlining risk modeling in software development, in accordance with one or more embodiments. For example, the system may use process 400 (e.g., as implemented on one or more system components described above) in order to streamline risk modeling in software development using natively sourced kernels.

At step 402, process 400 (e.g., using one or more components described above) receives a native kernel for a first model. For example, the system may receive, via a user interface, a first user input comprising a validation request for a first model, wherein the first model corresponds to a first software development project. The system's interface or application may receive the user input in various forms, such as a command-line instruction, a form submission on a graphical user interface (GUI), and/or an API request sent to the system. The system parses the user input to identify the specific validation request related to the first model of the software development project. This parsing process involves extracting relevant information, such as the model's name, project identifier, and/or any specific parameters associated with the validation request. The system may route the validated request to the appropriate module or component responsible for handling model validation tasks. This module may be part of the software development environment and is designed to manage validation procedures for different models within projects. Upon receiving the validation request, the system may retrieve necessary data related to the first model from the project repository or database. This data may include model specifications, documentation, testing protocols, and/or other relevant information needed for validation.

Additionally or alternatively, the system may receive, via the user interface, a second user input comprising a native kernel for the first model, wherein the native kernel comprises a native code sample and a native description of the native code sample. For example, the user may input the native code sample and the corresponding native description into the designated fields or sections within the user interface provided for model development or code input. The system may perform initial validation checks on the input data, ensuring it meets certain formatting requirements or constraints. It may also parse the user input to distinguish between the native code sample and its associated description. Once the user submits the input, the system processes this data and transmits it to the designated processing module responsible for handling model development, compilation, or interpretation.

At step 404, process 400 (e.g., using one or more components described above) inputs the native code sample into an artificial intelligence model to generate an output. For example, the system may input the native code sample into an artificial intelligence model to generate a first output. The system's processing module may receive the transmitted native kernel data, including the native code sample and its description.

The artificial intelligence model may be trained to validate code samples based on labeled source content and labeled code samples. The labeled source content may comprise rulesets for security vulnerabilities that are extracted and reformatted from a plurality of sources. The labeled code samples may comprise a first subset of labeled code samples successfully validated against the rulesets and a second subset of labeled code samples unsuccessfully validated against the rulesets. For example, the system may gather a diverse set of labeled source content containing rulesets for security vulnerabilities. These rulesets should cover a broad range of potential vulnerabilities. The system collects labeled code samples categorized into two subsets: code samples that successfully pass validation against the rulesets and code samples that fail validation against the rulesets due to security vulnerabilities (or other criteria). For example, the system may initiate the validation process for the first model based on predefined criteria or validation procedures, which may involve running tests, simulations, and/or comparisons against expected outcomes or benchmarks to verify the model's accuracy, performance, and/or compliance with specified requirements.

The system may preprocess the labeled source content and code samples to extract relevant features. This might involve tokenization, parsing, and/or other techniques to represent the content in a format suitable for artificial intelligence analysis. The system may convert the labeled content and code samples into a suitable representation for the artificial intelligence model to understand and process, such as numerical vectors using techniques like word embeddings or TF-IDF (Term Frequency-Inverse Document Frequency). The system may choose an appropriate artificial intelligence model, such as machine learning classifiers (e.g., support vector machines, random forests, neural networks) suitable for the task of validating code samples against the provided rulesets. The system may determine a similarity (e.g., based on code sample characteristics) between the native code sample and the first subset of labeled code samples.

For example, the system may select the artificial intelligence model from a plurality of artificial intelligence models. For example, the system may select a particular model based on a similarity between the native kernel that is input and the training data for a given model. By doing so, the system may increase accuracy and reliability of a given output. The system may select the artificial intelligence model from a plurality of artificial intelligence models based on the similarity between the native code sample and the first subset of labeled code samples.

The system may then train the selected model using the labeled data: The labeled source content with rulesets as inputs and the labeled code samples as outputs. The model learns to predict whether a given code sample complies with the rulesets or contains vulnerabilities. The system may validate the trained model's performance using validation techniques such as cross-validation or splitting the dataset into training and testing sets. The system may use assessment metrics like accuracy, precision, recall, and/or F1 score to evaluate the model's performance. The system may iterate on the model by fine-tuning parameters, adjusting features, and/or trying different models to improve its accuracy and effectiveness in identifying security vulnerabilities in code samples. The system may deploy the trained model into the system's workflow for code validation. The system may test the model's performance in a real or simulated environment to ensure it effectively identifies security vulnerabilities in new, unseen code samples. The system may then continuously update the model as new labeled data becomes available or as the rulesets for security vulnerabilities evolve. The system may also monitor the model's performance in the production environment and make necessary adjustments to maintain its effectiveness.

At step 406, process 400 (e.g., using one or more components described above) filters the output based on the native kernel to generate a validation assessment. For example, the system may filter the first output based on the native kernel to generate a first validation assessment for the first model. If the native code sample is meant for execution, the system may compile the code using an appropriate compiler specific to the native language or platform. Alternatively, if the code sample is for interpretative purposes, the system may directly interpret and execute it.

In some embodiments, the system may generate copious amounts of code samples and descriptions. In order to generate concise responses, the system may filter an output based on the native kernel. For example, the native code sample and its description are preprocessed to extract meaningful features. This might involve tokenization, parsing, or encoding techniques to represent the code and its description in a format suitable for the artificial intelligence model. The preprocessed native kernel is fed into the artificial intelligence model that has been trained for validation assessments. This model might be specifically designed to evaluate code samples against certain criteria, such as adherence to coding standards, security checks, or other validation criteria derived from the native descriptions. The system may apply filters or criteria to the artificial intelligence model's output to determine the validation assessment. These filters might include keywords, threshold values, rulesets, and/or conditions that define what constitutes a successful or unsuccessful validation assessment (or characteristics thereof such as length, line numbers, required keywords, values, rulesets, functions, etc.) based on the generated output. This assessment could include a report, score, and/or classification indicating the degree of compliance or validation success against the native kernel's description.

For example, the system may generate platform descriptions corresponding to the native kernel. The system may then filter the plurality of platform descriptions based on the native description. In some embodiments, filtering the plurality of platform descriptions based on the native kernel may comprise the system parsing the native description to determine a native description characteristic. The system may then filter the plurality of platform descriptions based on the native description characteristic. As one example, parsing the native description to determine the native description characteristic may comprise determining a desired output corresponding to the native description characteristic and determining a platform output corresponding to the desired output for use in filtering the plurality of platform descriptions. As another example, parsing the native description to determine the native description characteristic may comprise determining an input data type corresponding to the native description characteristic and determining a platform data type corresponding to the input data type for use in filtering the plurality of platform descriptions. As yet another example, parsing the native description to determine the native description characteristic may comprise determining a security vulnerability category corresponding to the native description characteristic and determining a platform security vulnerability category corresponding to the security vulnerability category for use in filtering the plurality of platform descriptions.

In some embodiments, the system may generate copious amounts of code samples and descriptions. In order to generate concise responses, the system may filter an output based on the native kernel. For example, when filtering the first output based on the native kernel to generate the first validation assessment for the first model, the system may determine a plurality of platform code samples corresponding to the native kernel and filter the plurality of platform code samples based on the native code sample. In some embodiments, filtering the plurality of platform code samples based on the native kernel may comprise the system parsing the native code sample to determine a native code sample characteristic and filtering the plurality of platform code samples based on the native code sample characteristic. For example, parsing the native code sample to determine the native code sample characteristic may comprise the system determining a code function corresponding to the native code sample characteristic and determining a platform function corresponding to the code function for use in filtering the plurality of platform code samples. In another example, parsing the native code sample to determine the native code sample characteristic may comprise the system determining a security vulnerability corresponding to the native code sample characteristic and determining a platform security vulnerability corresponding to the security vulnerability for use in filtering the plurality of platform code samples. In another example, parsing the native code sample to determine the native code sample characteristic may comprise the system determining a naming convention corresponding to the native code sample characteristic and determining a platform naming convention corresponding to the naming convention for use in filtering the plurality of platform code samples.

In some embodiments, generating the first validation assessment for the first model further may comprise inputting the first output into a generative artificial intelligence model to generate a second output and generating a platform description based on the second output. For example, the system may gather a dataset comprising native descriptions from the source model and corresponding platform descriptions from the target model. These descriptions might include information about the architecture, features, functionalities, or any other relevant details specific to each model or platform. The system may preprocess the collected data, including tokenization, cleaning, and formatting, to prepare it for input into the generative artificial intelligence model. The system may select a generative artificial intelligence model capable of understanding and generating text in a way that captures the essence of the platform descriptions. Models like transformers, recurrent neural networks (RNNs), or sequence-to-sequence models may be suitable for this task. The system may train the chosen generative artificial intelligence model using the collected dataset, where the native descriptions serve as input and the corresponding platform descriptions act as the target output. By doing so, the generative artificial intelligence model learns the mapping or relationship between the native descriptions and platform descriptions during the training process. After the generative model is trained, the system may input a native description of a model into the trained model. The generative artificial intelligence model generates a platform description (or native code sample) based on its learned associations between the source (native) and target (platform) descriptions (or native code samples).

At step 408, process 400 (e.g., using one or more components described above) generates for display the validation assessment. For example, the system may generate for display, in the user interface, the first validation assessment. In some embodiments, the validation assessment may be presented to a user through the user interface, sent as notifications, and/or made available for access through appropriate channels. Users can review these results to understand the model's validation status and take necessary actions based on the findings. For example, upon successful compilation or execution, the system may generate an output, which could be visualizations, logs, and/or any relevant information derived from the native code's execution. This output might be presented to the user through the user interface for review and analysis. During compilation or execution, if errors or issues arise within the native code, the system may handle them based on predefined error handling routines. Feedback or error messages might be sent back to the user through the user interface, indicating where issues occurred within the code and/or its description.

In some embodiments, generating the first validation assessment for the first model may comprise selecting a platform template from a plurality of templates corresponding to the native kernel and generating the first validation assessment based on the platform template. For example, the system may define selection criteria based on the characteristics, requirements, or specific aspects of the source model's native kernel. Criteria might include the type of model, programming language, architecture, specific functionalities, or compliance with certain standards. The system may maintain a repository or library containing a variety of platform templates corresponding to different types of source models or development environments. Each template represents a standardized structure or framework for the target platform. The system may analyze the native kernel of the source model to understand its key attributes, components, architecture, or requirements. This analysis helps in identifying the most suitable platform template that aligns with the native kernel's characteristics. The system may compare the characteristics and requirements of the native kernel with the attributes of available platform templates. The system may use algorithms, rulesets, or similarity measures to match the native kernel with the most fitting platform template from the repository. Once the suitable platform template is selected, the system may integrate the source model's native kernel into the chosen template structure or framework. This integration involves mapping components, functionalities, or elements of the native kernel onto the corresponding sections or modules within the platform template. The system may utilize the integrated source model within the selected platform template to conduct validation assessments and/or execute predefined tests, checks, or validation procedures specified within the template to evaluate the compliance, performance, or adherence of the source model to the platform's standards or requirements. The system may analyze the results of the validation assessments performed within the platform template and assess the source model's strengths, weaknesses, adherence to guidelines, or any discrepancies identified during the validation process. The system may then generate comprehensive reports documenting the validation assessment results, highlighting areas of compliance or non-compliance with the platform template's standards. This documentation aids in understanding the validation outcomes and any necessary improvements or modifications required for the source model.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:
1. A method for streamlining risk modeling in software development using natively sourced kernels.
2. The method of the preceding embodiment, further comprising: receiving, via a user interface, a first user input comprising a validation request for a first model, wherein the first model corresponds to a first software development project; receiving, via the user interface, a second user input comprising a native kernel for the first model, wherein the native kernel comprises a native code sample and a native description of the native code sample; inputting the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, and wherein the labeled code samples comprise a first subset of labeled code samples successfully validated against the rulesets and a second subset of labeled code samples unsuccessfully validated against the rulesets; filtering the first output based on the native kernel to generate a first validation assessment for the first model; and generating for display, in the user interface, the first validation assessment.

3. The method of any one of the preceding embodiments, wherein filtering the first output based on the native kernel to generate the first validation assessment for the first model further comprises: determining a plurality of platform descriptions corresponding to the native kernel; and filtering the plurality of platform descriptions based on the native description.

4. The method of any one of the preceding embodiments, wherein filtering the plurality of platform descriptions based on the native kernel further comprises: parsing the native description to determine a native description characteristic; and filtering the plurality of platform descriptions based on the native description characteristic.

5. The method of any one of the preceding embodiments, wherein parsing the native description to determine the native description characteristic further comprises: determining a desired output corresponding to the native description characteristic; and determining a platform output corresponding to the desired output for use in filtering the plurality of platform descriptions.

6. The method of any one of the preceding embodiments, wherein parsing the native description to determine the native description characteristic further comprises: determining an input data type corresponding to the native description characteristic; and determining a platform data type corresponding to the input data type for use in filtering the plurality of platform descriptions.

7. The method of any one of the preceding embodiments, wherein parsing the native description to determine the native description characteristic further comprises: determining a security vulnerability category corresponding to the native description characteristic; and determining a platform security vulnerability category corresponding to the security vulnerability category for use in filtering the plurality of platform descriptions.

8. The method of any one of the preceding embodiments, wherein filtering the first output based on the native kernel to generate the first validation assessment for the first model further comprises: determining a plurality of platform code samples corresponding to the native kernel; and filtering the plurality of platform code samples based on the native code sample.

9. The method of any one of the preceding embodiments, wherein filtering the plurality of platform code samples based on the native kernel further comprises: parsing the native code sample to determine a native code sample characteristic; and filtering the plurality of platform code samples based on the native code sample characteristic.

10. The method of any one of the preceding embodiments, wherein parsing the native code sample to determine the native code sample characteristic further comprises: determining a code function corresponding to the native code sample characteristic; and determining a platform function corresponding to the code function for use in filtering the plurality of platform code samples.

11. The method of any one of the preceding embodiments, wherein parsing the native code sample to determine the native code sample characteristic further comprises: determining a security vulnerability corresponding to the native code sample characteristic; and determining a platform security vulnerability corresponding to the security vulnerability for use in filtering the plurality of platform code samples.

12. The method of any one of the preceding embodiments, wherein parsing the native code sample to determine the native code sample characteristic further comprises: determining a naming convention corresponding to the native code sample characteristic; and determining a platform naming convention corresponding to the naming convention for use in filtering the plurality of platform code samples.

13. The method of any one of the preceding embodiments, further comprising: determining a similarity between the native code sample and the first subset of labeled code samples; and selecting the artificial intelligence model from a plurality of artificial intelligence models based on the similarity between the native code sample and the first subset of labeled code samples.

14. The method of any one of the preceding embodiments, wherein generating the first validation assessment for the first model further comprises: inputting the first output into a generative artificial intelligence model to generate a second output; and generating a platform description based on the second output.

15. The method of any one of the preceding embodiments, wherein generating the first validation assessment for the first model further comprises: selecting a platform template from a plurality of templates corresponding to the native kernel; and generating the first validation assessment based on the platform template.

16. A tangible, non-transitory, computer-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for streamlining risk modeling in software development using natively sourced kernels, the system comprising:
one or more processors; and
one or more computer-readable media comprising instructions recorded thereon that when executed by one or more processors cause operations comprising:

receiving, via a user interface, a first user input comprising a validation request for a first model, wherein the first model corresponds to a first software development project;

receiving, via the user interface, a second user input comprising a native kernel for the first model, wherein the native kernel comprises a native code sample and a native description of the native code sample, and wherein the native code sample comprises source code for a specified functionality of the first model;

inputting the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, and wherein the labeled code samples comprise a first subset of labeled code samples successfully validated against the rulesets and a second subset of labeled code samples unsuccessfully validated against the rulesets, wherein the first output comprises a plurality of platform code samples and a plurality of platform descriptions, and wherein the artificial intelligence model comprises a large language model (LLM) that is trained by:

generating training data by converting the labeled source content and labeled code samples comprising unstructured data into respective numerical vectors using Term Frequency-Inverse Document Frequency; and training the LLM using the training data;

filtering the plurality of platform code samples and the plurality of platform descriptions based on the native kernel to generate a first validation assessment for the first model, wherein the first validation assessment comprises a platform code sample corresponding to the native code sample and a platform description corresponding to the native description, wherein the platform code sample corresponds to specified functionality, and wherein the platform description uses a taxonomy of the first model; and generating for display, in the user interface, the first validation assessment, wherein generating the first validation assessment for the first model further comprises selecting a platform template from a plurality of templates corresponding to the native kernel and generating the first validation assessment based on the platform template.

2. A method for streamlining risk modeling in software development using natively sourced kernels, the method comprising:

receiving, via a user interface, a first user input comprising a validation request for a first model, wherein the first model corresponds to a first software development project;

receiving, via the user interface, a second user input comprising a native kernel for the first model, wherein the native kernel comprises a native code sample and a native description of the native code sample;

inputting the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, wherein the labeled code samples comprise a first subset of labeled code samples successfully validated against the rulesets and a second subset of labeled code samples unsuccessfully validated against the rulesets, and wherein the artificial intelligence model comprises a large language model (LLM) that is trained by:

generating training data by converting the labeled source content and labeled code samples into respective numerical vectors using Term Frequency-Inverse Document Frequency; and training the LLM using the training data;

filtering the first output based on the native kernel to generate a first validation assessment for the first model, wherein the first validation assessment comprises a platform code sample corresponding to the native code sample and a platform description corresponding to the native description, wherein the platform code sample corresponds to specified functionality, and wherein the platform description uses terminology of the first model; and generating for display, in the user interface, the first validation assessment, wherein generating the first validation assessment for the first model further comprises selecting a platform template from a plurality of templates corresponding to the native kernel and generating the first validation assessment based on the platform template.

3. The method of claim 2, wherein filtering the first output based on the native kernel to generate the first validation assessment for the first model further comprises:

determining a plurality of platform descriptions corresponding to the native kernel; and filtering the plurality of platform descriptions based on the native description.

4. The method of claim 3, wherein filtering the plurality of platform descriptions based on the native kernel further comprises:

parsing the native description to determine a native description characteristic; and filtering the plurality of platform descriptions based on the native description characteristic.

5. The method of claim 4, wherein parsing the native description to determine the native description characteristic further comprises:

determining a desired output corresponding to the native description characteristic; and determining a platform output corresponding to the desired output for use in filtering the plurality of platform descriptions.

6. The method of claim 4, wherein parsing the native description to determine the native description characteristic further comprises:

determining an input data type corresponding to the native description characteristic; and determining a platform data type corresponding to the input data type for use in filtering the plurality of platform descriptions.

7. The method of claim 4, wherein parsing the native description to determine the native description characteristic further comprises:

determining a security vulnerability category corresponding to the native description characteristic; and determining a platform security vulnerability category corresponding to the security vulnerability category for use in filtering the plurality of platform descriptions.

8. The method of claim 2, wherein filtering the first output based on the native kernel to generate the first validation assessment for the first model further comprises:
- determining a plurality of platform code samples corresponding to the native kernel; and
- filtering the plurality of platform code samples based on the native code sample.

9. The method of claim 8, wherein filtering the plurality of platform code samples based on the native kernel further comprises:
- parsing the native code sample to determine a native code sample characteristic; and
- filtering the plurality of platform code samples based on the native code sample characteristic.

10. The method of claim 9, wherein parsing the native code sample to determine the native code sample characteristic further comprises:
- determining a code function corresponding to the native code sample characteristic; and
- determining a platform function corresponding to the code function for use in filtering the plurality of platform code samples.

11. The method of claim 9, wherein parsing the native code sample to determine the native code sample characteristic further comprises:
- determining a security vulnerability corresponding to the native code sample characteristic; and
- determining a platform security vulnerability corresponding to the security vulnerability for use in filtering the plurality of platform code samples.

12. The method of claim 9, wherein parsing the native code sample to determine the native code sample characteristic further comprises:
- determining a naming convention corresponding to the native code sample characteristic; and
- determining a platform naming convention corresponding to the naming convention for use in filtering the plurality of platform code samples.

13. The method of claim 2, further comprising:
- determining a similarity between the native code sample and the first subset of labeled code samples; and
- selecting the artificial intelligence model from a plurality of artificial intelligence models based on the similarity between the native code sample and the first subset of labeled code samples.

14. The method of claim 2, wherein generating the first validation assessment for the first model further comprises:
- inputting the first output into a generative artificial intelligence model to generate a second output; and
- generating a platform description based on the second output.

15. One or more non-transitory, computer-readable media comprising instructions recorded thereon that when executed by one or more processors cause operations comprising:
- receiving a native kernel for a first model, wherein the native kernel comprises a native code sample and a native description of the native code sample;
- inputting the native kernel into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, wherein the labeled code samples comprise a first subset of labeled code samples successfully validated against the rulesets and a second subset of labeled code samples unsuccessfully validated against the rulesets, and wherein the artificial intelligence model comprises a large language model (LLM) that is trained by:
  - generating training data by converting the labeled source content and labeled code samples into respective numerical vectors using word embeddings; and
  - training the LLM using the training data;
- filtering the first output based on the native kernel to generate a first validation assessment for the first model; and
- generating for display the first validation assessment, wherein generating the first validation assessment for the first model further comprises selecting a platform template from a plurality of templates corresponding to the native kernel and generating the first validation assessment based on the platform template.

16. The one or more non-transitory, computer-readable media of claim 15, wherein filtering the first output based on the native kernel to generate the first validation assessment for the first model further comprises:
- determining a plurality of platform descriptions corresponding to the native kernel; and
- filtering the plurality of platform descriptions based on the native description.

17. The one or more non-transitory, computer-readable media of claim 16, wherein filtering the plurality of platform descriptions based on the native kernel further comprises:
- parsing the native description to determine a native description characteristic; and
- filtering the plurality of platform descriptions based on the native description characteristic.

18. The one or more non-transitory, computer-readable media of claim 17, wherein parsing the native description to determine the native description characteristic further comprises:
- determining a desired output corresponding to the native description characteristic; and
- determining a platform output corresponding to the desired output for use in filtering the plurality of platform descriptions.

19. The one or more non-transitory, computer-readable media of claim 17, wherein parsing the native description to determine the native description characteristic further comprises:
- determining an input data type corresponding to the native description characteristic; and
- determining a platform data type corresponding to the input data type for use in filtering the plurality of platform descriptions.

* * * * *